(12) United States Patent
Sasaki et al.

(10) Patent No.: US 8,967,813 B2
(45) Date of Patent: Mar. 3, 2015

(54) LENS FRAME, LENS HOLDING DEVICE, AND PROJECTOR

(75) Inventors: Fumihide Sasaki, Matsumoto (JP); Kazuyuki Iinuma, Azumino (JP); Hiroshi Abe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 792 days.

(21) Appl. No.: 12/693,806

(22) Filed: Jan. 26, 2010

(65) Prior Publication Data

US 2010/0188645 A1 Jul. 29, 2010

(30) Foreign Application Priority Data

Jan. 29, 2009 (JP) ................................. 2009-017711

(51) Int. Cl.
G03B 21/14 (2006.01)
G02B 7/02 (2006.01)
G02B 13/16 (2006.01)

(52) U.S. Cl.
CPC ............... *G03B 21/14* (2013.01); *G02B 7/026* (2013.01); *G02B 13/16* (2013.01)
USPC ....................................................... 353/100

(58) Field of Classification Search
CPC ...... G03F 7/70833; G02B 7/02; G03B 21/00; G03B 21/14
USPC ............................ 353/100, 101; 359/818, 819
See application file for complete search history.

(56) References Cited

U.S. PATENT DOCUMENTS

| | | | |
|---|---|---|---|
| 2005/0001998 A1* | 1/2005 | Tsubata et al. | 353/100 |
| 2007/0008482 A1* | 1/2007 | Teng | 351/41 |
| 2008/0055560 A1* | 3/2008 | Yamamoto et al. | 353/52 |

FOREIGN PATENT DOCUMENTS

| | | |
|---|---|---|
| JP | 54-081343 U | 11/1977 |
| JP | 55-130311 U | 2/1979 |
| JP | 08-131475 A | 5/1996 |
| JP | 2000-304905 A | 11/2000 |
| JP | 2007-303531 A | 11/2007 |
| JP | 3140015 U | 2/2008 |
| JP | 2008-58675 A | 3/2008 |
| JP | 2008-058675 A | 3/2008 |

* cited by examiner

*Primary Examiner* — Sultan Chowdhury
*Assistant Examiner* — Danell L Owens
(74) *Attorney, Agent, or Firm* — ALG Intellectual Property, LLC

(57) ABSTRACT

A lens frame configured to hold a lens of an optical system of a projector comprising: a holder being formed along the periphery of the lens, holds the lens which is inserted by an elastic force of the frame main body, the holder includes a first holding portion configured to hold a peripheral end surface of the lens, and a second holding portion configured to hold a luminous flux incidence surface and luminous flux exit surface of the lens.

13 Claims, 4 Drawing Sheets

LENS FRAME, LENS HOLDING DEVICE, AND PROJECTOR

BACKGROUND

1. Technical Field

The present invention relates to a lens frame, a lens holding device including a lens in the lens frame, and a projector including the lens holding device.

2. Related Art

To date, a contrast, or the like, of an optical image to be projected has been improved by carrying out an optical axis adjustment on a lens (for example, a superimposing lens or a relay lens) configuring an optical system of a projector. The optical axis adjustment of the lens is carried out by adjusting a position of a lens frame holding the lens.

Regarding the lens frame holding the lens, JA-A-2008-58675 discloses an adjustment part (the lens frame) including a positioning fit-in portion, in which one side of the periphery of the lens is fitted and positioned, and an elastic fit-in portion, in which the other side of the periphery of the lens is elastically fitted. Then, the lens is held in the lens frame by tucking one side of the periphery of the lens into the positioning fit-in portion, and pushing the other side of the periphery of the lens so that it slides into the elastic fit-in portion.

However, with JP-A-2008-58675, when holding the lens in the lens frame, it is necessary to tuck the lens into the positioning fit-in portion, and it cannot necessarily be said to be an effective lens frame configuration in terms of an ease of assembly. The structures of the positioning fit-in portion, elastic fit-in portion, and the like, are also complicated. Consequently, a lens frame, a lens holding device including a lens in the lens frame, and a projector including the lens holding device, which can improve the ease of assembly, and can hold the lens with a simple configuration, have been demanded.

SUMMARY

An advantage of some aspects of the invention is to solve at least a part of the problem mentioned above, and the invention can be realized as the following aspects or application examples.

A lens frame according to this application example, configured to hold a lens of an optical system of a projector, includes a holder being formed along the periphery of the lens, holds the lens which is inserted by an elastic force of the frame main body. The holder includes a first holding portion configured to hold a peripheral end surface of the lens, and a second holding portion configured to hold a luminous flux incidence surface and luminous flux exit surface of the lens.

According to this kind of lens frame, when building the lens into the holder of the frame main body, simply by an elastic force of the frame main body, and inserting the lens thereinto, it is possible to hold the lens by the action of an elastic force of the holder. Also, when holding the lens, by the first holding portion holding the peripheral end surface side of the lens, and the second holding portion holding the luminous flux incidence surface and luminous flux exit surface of the lens, it is possible to reliably hold the lens without rattling, or the like. Consequently, it is possible to achieve an improvement in ease of assembly, and realize a lens frame which can reliably hold the lens with a simple configuration.

With the lens frame according to the previously mentioned application example, it is preferable that the second holding portion are formed so that holding areas of the second holding portion configured to hold one surface side of the lens to be first inserted are wider than holding areas of the second holding portion configure to hold the other surface side of the lens.

According to this kind of lens frame, for example, when the luminous flux incidence surface side of the second holding portion holds the one surface side of the lens which is first inserted, the luminous flux incidence surface side holding areas (of the second holding portion) are formed wider than the luminous flux exit surface side holding areas (of the second holding portion) configured to hold the other surface side of the lens. Also, conversely, when the luminous flux exit surface side of the second holding portion holds the one surface side of the lens which is first inserted, the luminous flux exit surface side holding areas (of the second holding portion) are formed wider than the luminous flux incidence surface side holding areas (of the second holding portion) configured to hold the other surface side of the lens. In this way, by the fact that the holding areas of the second holding portion configured to hold the surface side of the lens to be first inserted are wider than the holding areas configured to hold the other surface side of the lens, it is possible to stably insert the lens.

With the lens frame according to the previously mentioned application example, it is preferable that the frame main body includes an opening made by cutting out one portion of the holder.

According to this kind of lens frame, when inserting the lens into the frame main body, by the frame main body including the opening, it is possible to subject the frame main body to a distortion suppressed elastic deformation, and it is possible to carry our the stable insertion.

With the lens frame according to the previously mentioned application example, it is preferable that the frame main body includes auxiliary portion for elastically deforming the frame main body outward.

According to this kind of lens frame, it is possible to elastically deform the frame main body, for example, by bringing a tool into engagement with the auxiliary portion. Because of this, it becomes easier to insert the lens into the lens frame.

With the lens frame according to the previously mentioned application example, it is preferable that the auxiliary portion are installed near both sides of the opening of the frame main body.

According to this kind of lens frame, by the auxiliary portion being installed near both sides of the opening of the frame main body, it is possible to reduce a force for causing the deformation, and it is possible to efficiently elastically deform the frame main body outward, so it becomes still easier to insert the lens into the lens frame.

A projector according to this application example; a lens configuring an optical system of a projector is held in the lens frame, a light source configured to emit a luminous flux; and an optical modulation devices configured to modulate the luminous flux emitted from the light source and transmitted via the lens holding device, based on an image signal.

According to this kind of projector, as the projector is configured including the lens holding device configured to reliably hold the lens with the simply configured lens frame, a reliability of quality of the projector is improved.

BRIEF DESCRIPTION OF THE DRAWINGS

The invention will be described with reference to the accompanying drawings, wherein like numbers reference like elements.

FIGS. 3A and 3B show a lens holding device, wherein FIG. 3A is an assembly perspective view of the lens holding device, and FIG. 3B is a perspective view of the lens holding device.

DESCRIPTION OF EXEMPLARY EMBODIMENTS

Hereafter, a description will be given of an embodiment, based on the drawings.

Figure 1:
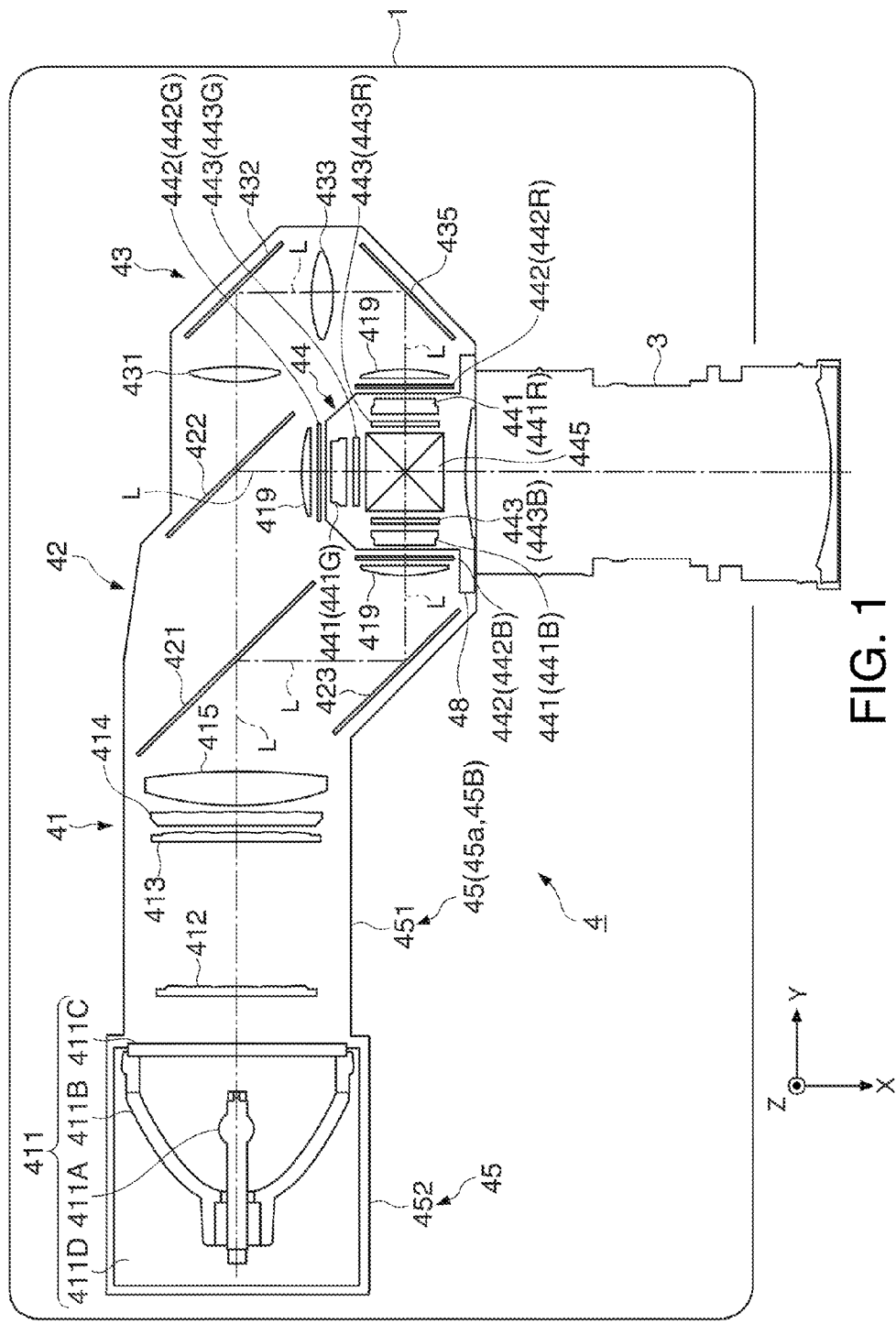
FIG. 1 is a diagram showing structures of optical systems of a projector according to an embodiment.
Figure 2:
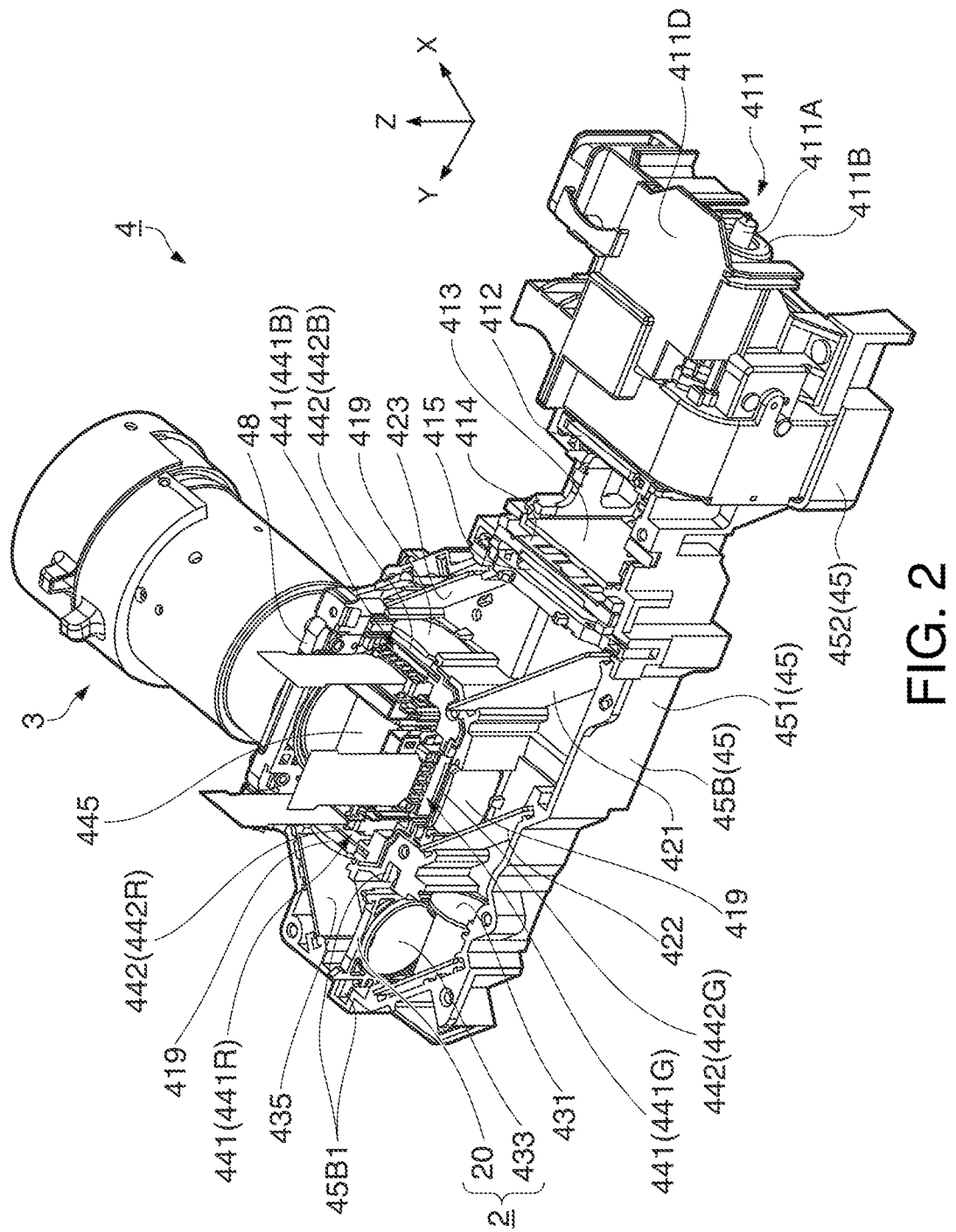
FIG. 2 is a perspective view showing a structure of an optical unit.

FIG. 1 is a diagram showing structures of optical systems of a projector according to the embodiment. FIG. 2 is a perspective view showing a structure of an optical unit. A description will be given, using FIGS. 1 and 2, of configurations and operations of the optical systems and optical unit 4 of the projector 1.

The projector 1 is configured including the optical unit 4. The optical unit 4 is one which, based on an image signal, modulates a luminous flux emitted from a light source device 411, forming an optical image, and forms a projection image on a screen acting as a projection object surface, via a projection lens 3. The optical systems of the optical unit 4 are configured including an integrator illumination optical system 41, a color separation optical system 42, a relay optical system 43, optical modulation devices, and a color synthesis optical system. Also, the optical modulation devices and color synthesis optical system are configured as an integrated optical device 44.

The optical unit 4 includes an optical case 45 which houses and fixes individual optical parts configuring the optical systems 41, 42, and 43. Specifically, the optical case 45 is configured of an optical part housing portion 451, which houses the individual optical parts configuring the optical systems 41, 42, and 43, and a light source housing portion 452, which houses the light source device 411. Also, the optical case 45 being configured of an upper housing case 45A and lower housing case 45B, optical parts corresponding to the optical part housing portion 451 and light source housing portion 452 are housed in a form in which they are sandwiched from above and below by the upper housing case 45A and lower housing case 45B. Then, the upper housing case 45A and lower housing case 45B are screw fixed into a unit, and fixed to a lower casing (not shown) of the projector 1 by a fixing screw.

A description will be given of configurations and operations of the optical systems.

The integrator illumination optical system 41 is an optical system for equalizing illuminance in a plane perpendicular to an illumination optical axis L of the luminous flux emitted from the light source device 411. The integrator illumination optical system 41 is configured including the light source device 411, a first lens array 412, a second lens array 413, a polarization conversion element 414, and a superimposing lens 415.

The light source device 411 is configured including a light source lamp 411A acting as a light source which emits a luminous flux, a reflector 411B, explosion proof glass 411C which covers the luminous flux exit surface side of the reflector 411B, and a light source case 411D which houses and fixes the light source lamp 411A, reflector 411B, and explosion proof glass 411C.

A radial luminous flux emitted from the light source lamp 411A is reflected by the reflector 411B, made an approximately parallel luminous flux, and emitted to the subsequent stage. In the embodiment, a high pressure mercury-vapor lamp is used as the light source lamp 411A, and a paraboloidal mirror is used as the reflector 411B. The light source lamp 411A not being limited to a high pressure mercury-vapor lamp, it is acceptable to use, for example, a metal halide lamp or a halogen lamp. Also, a paraboloidal mirror is used as the reflector 411B but, not being limited to this, it is acceptable to use a configuration such that a parallelizing concave lens is disposed on the luminous flux exit surface side of a reflector configured of an ellipsoidal mirror.

The first lens array 412 has a configuration such that small lenses having an approximately rectangularly-shaped outline, as seen from the direction of the illumination optical axis L, are arrayed in a matrix form. The individual small lenses divide the luminous flux emitted from the light source lamp 411A into partial luminous fluxes, and emit them in the direction of the illumination optical axis L. The second lens array 413, being of approximately the same configuration as that of the first lens array 412, has a configuration such that small lenses are arrayed in a matrix form. The second lens array 413 has a function of, together with the superimposing lens 415, focusing images from the individual small lenses of the first lens array 412 onto the optical modulation devices (liquid crystal panels 441), to be described hereafter, of the optical device 44.

The polarization conversion element 414 is one which converts lights from the second lens array 413 into approximately one kind of polarized light, thereby increasing a light use efficiency in the optical device 44. Specifically, individual partial luminous fluxes converted into the approximately one kind of polarized light by the polarization conversion element 414 are approximately superimposed on the liquid crystal panels 441, to be described hereafter, of the optical device 44 by the superimposing lens 415.

The color separation optical system 42 includes two dichroic mirrors 421 and 422, and a reflecting mirror 423. A plurality of partial luminous fluxes emitted from the integrator illumination optical system 41 are separated into color lights of three colors, red (R), green (G), and blue (B), by the two dichroic mirrors 421 and 422.

The relay optical system 43 includes an incidence side lens 431, a relay lens 433, and reflecting mirrors 432 and 435. The relay optical system 43 has a function of leading the red color light, which is one of the color lights separated by the color separation optical system 42, to the red color light liquid crystal panel 441, to be described hereafter, of the optical device 44.

The dichroic mirror 421 of the color separation optical system 42 transmits a green color light component and a red color light component, and reflects a blue color light component, among the luminous fluxes emitted from the integrator illumination optical system 41. The blue color light reflected by the dichroic mirror 421 is reflected by the reflecting mirror 423, passes through a field lens 419, and reaches the blue color light liquid crystal panel 441. The field lens 419 converts the individual partial luminous fluxes emitted from the second lens array 413 into luminous fluxes parallel to the central axis (principal ray) of the individual partial luminous fluxes. The same applies to field lenses 419 provided on the luminous flux incidence sides of the red color light and green color light liquid crystal panels 441.

Of the red color light and green color light transmitted through the dichroic mirror 421, the green color light is reflected by the dichroic mirror 422, passes through the field lens 419, and reaches the green color light liquid crystal panel 441. Meanwhile, the red color light is transmitted through the dichroic mirror 422, passes through the relay optical system 43, furthermore, passes through the field lens 419, and reaches the red color light liquid crystal panel 441.

Using the relay optical system 43 for the red color light is, as the optical path length of the red color light is greater than the optical path lengths of the other color lights, for the purpose of preventing a reduction in light use efficiency due to light divergence, or the like. That is, it is for the purpose of transmitting partial luminous fluxes falling incident on the incidence side lens 431, as they are, to the field lens 419. A configuration is adopted such as to pass the red color light, among the three color lights, through the relay optical system 43 but, not being limited to this, it is acceptable to adopt a configuration such as to pass, for example, the blue color light.

The optical device 44, based on the image signal, modulates the incident luminous fluxes, forming a color image. The optical device 44 includes three incidence side polarizing plates 442 as the optical element into which individual color lights separated by the color separation optical system 42 enter (one for the red color light is taken to be a red color light incidence side polarizing plate 442R, one for the green color light to be a green color light incidence side polarizing plate 442G, and one for the blue color light to be a blue color light incidence side polarizing plate 442B). Also, the optical device 44 includes three liquid crystal panels 441 (one for the red color light is taken to be a red color light liquid crystal panel 441R, one for the green color light to be a green color light liquid crystal panel 441G, and one for the blue color light to be a blue color light liquid crystal panel 441B) as the optical modulation devices installed in the subsequent stages of the respective incidence side polarizing plates 442. Also, the optical device 44 includes three exit side polarizing plates 443 (one for the red color light is taken to be a red color light exit side polarizing plate 443R, one for the green color light to be a green color exit side polarizing plate 443G, and one for the blue color light to be a blue color light exit side polarizing plate 443B) installed in the subsequent stages of the respective liquid crystal panels 441, and a cross dichroic prism 445 as one color synthesis optical system.

Each liquid crystal panel 441 (441R, 441G, and 441B) being such that, for example, a polysilicon thin film transistor (TFT) is used as a switching element, liquid crystal is hermetically enclosed in a pair of transparent substrates disposed oppositely. The liquid crystal panels 441, based on the image signal, modulate luminous fluxes falling incident thereon via the incidence side polarizing plates 442, and emit them.

The incidence side polarizing plates 442 transmit only a polarized light of a certain direction, among the color lights separated by the color separation optical system 42, and absorb the other luminous fluxes. The exit side polarizing plates 443, also being configured in approximately the same way as the incidence side polarizing plates 442, transmit only a polarized light of a predetermined direction, among the luminous fluxes emitted from the liquid crystal panels 441, and absorb the other luminous fluxes, and the polarizing axis of the polarized light transmitted therethrough is set so as to be perpendicular to the polarizing axis of the polarized light transmitted through the incidence side polarizing plates 442.

The cross dichroic prism 445 synthesizes optical images emitted from the exit side polarizing plates 443 and modulated for each color light, forming a color image. In the cross dichroic prism 445, a dielectric multilayer film which reflects the red color light, and a dielectric multilayer film which reflects the blue color light, are provided in an approximate X shape along the interfaces of four right angle prisms, and the three color lights are synthesized by the dielectric multilayer films. A color light synthesized by the cross dichroic prism 445 is emitted in the direction of the projection lens 3. Then, the optical image (video light) emitted from the cross dichroic prism 445 is enlarged by the projection lens 3, and projected onto the screen, as the color image.

The heretofore described liquid crystal panels 441 (441R, 441G, and 441B) and exit side polarizing plates 443 (443R, 443G, and 443B) are fixed to the cross dichroic prism 445 with fixing members interposed between them, configuring the optical device 44. The optical device 44 (the liquid crystal panels 441, exit side polarizing plates 443, and cross dichroic prism 445) is of a structure such that it is fixed to a fixing frame body 48. The incidence side polarizing plates 442 included in the optical device 44 are fixed to the previously described optical part housing portion 451 side.

Figure 3:
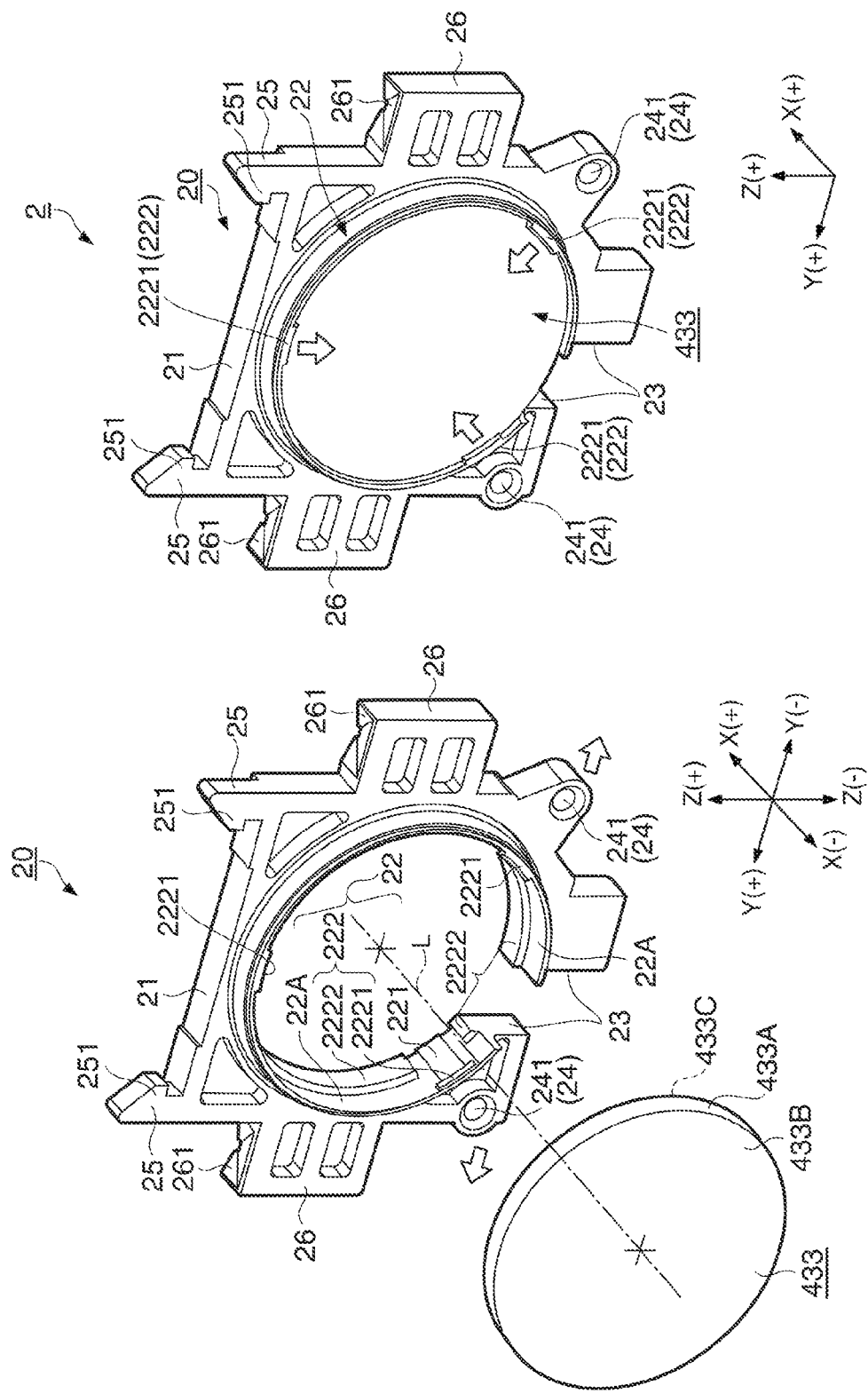
Figure 4:
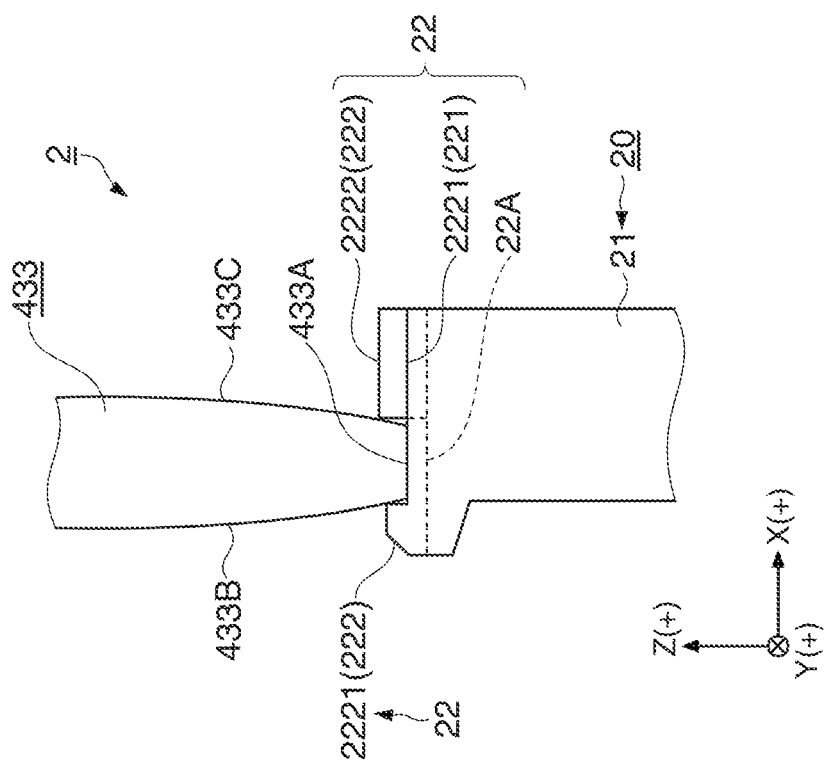
FIG. 4 is a fragmentary sectional view of the lens holding device.

FIGS. 3A and 3B show a lens holding device. FIG. 3A is an assembly perspective view of the lens holding device, FIG. 3B is a perspective view of the lens holding device, and FIG. 4 is a fragmentary sectional view of the lens holding device. The coordinate axes shown in FIGS. 3A, 3B, and 4 are such that, for convenience of description, directions along the illumination optical axis L are taken to be X axis directions, left and right directions of the illumination optical axis L to be Y axis directions, and up and down directions of the illumination optical axis L to be Z axis directions. Also, + and − are affixed to each axis.

A description will be given, referring to FIGS. 3A, 3B, and 4, of a configuration of the lens holding device 2.

FIGS. 3A, 3B, and 4 show an embodiment wherein the relay lens 433 configuring the relay optical system 43 shown in FIG. 1 is held in a lens frame 20. The previously described FIG. 2 shows the lens holding device 2 assembled by inserting the relay lens 433 into the lens frame 20, as shown in FIG. 3B.

The lens frame 20 is formed including a frame main body 21 forming an approximately rectangular shape. The frame main body 21 has a holder 22 formed along the peripheral shape of the relay lens 433. An opening 23 made by cutting out a portion ranging from a bottom of the holder 22 to a periphery of the frame main body 21 is formed in the frame main body 21.

Also, the frame main body 21 has auxiliary portion 24, which have holes 241 for elastically deforming the frame main body 21 outward, and which are formed near both sides of the opening 23. Also, the frame main body 21 has formed thereon projecting portion 25 which project upward from the upper left and right corners, and whose inner sides have engagement projections 251.

Also, the frame main body 21 has formed thereon fixing portion 26 which, extending from the left and right side surfaces, have pyramid-shaped inlets 261 formed in a depressed shape. The fixing portion 26 are used when fixing the relay lens 433 to the lower housing case 45B after inserting the relay lens 433 into the lens frame 20.

Next, a description will be given of a configuration of the holder 22.

In the embodiment, the holder 22 is formed along the peripheral shape (a peripheral end face 433A) of the round shape of the relay lens 433, as heretofore described. The holder 22 includes on a side surface 22A thereof first holding portion 221, which hold the peripheral end face 433A side of the relay lens 433, and second holding portion 222, which hold a luminous flux incidence surface 433B side and luminous flux exit surface 433C side of the relay lens 433.

The second holding portion 222 are formed so that three separately disposed incidence side holding portions 2221 project inward from the side surface 22A on the X (−) side shown in the coordinate systems of FIGS. 3A and 3B, which is the luminous flux incidence side, in the holder 22. Also, the second holding portion 222 are formed so that three separately disposed exit side holding portions 2222 project inward from the side surface 22A on the X (+) side shown in the coordinate system of FIGS. 3A and 3B, which is the luminous flux exit side, in the holder 22. In the embodiment, the exit side holding portion 2222 positioned at the bottom has a form such that it is split by the opening 23.

The three incidence side holding portions 2221 and exit side holding portions 2222 are formed in a condition in which they do not overlap each other, when seen from the direction of the illumination optical axis L (X axis). Also, the three incidence side holding portions 2221 and exit side holding portions 2222 are formed so that the length of the exit side holding portions 2222 extending along the side surface 22A is greater than the length of the incident side holding portions 2221 extending along the side surface 22A. Also, the three incidence side holding portions 2221 and exit side holding portions 2222 are formed so that the amount of projection of the exit side holding portions 2222 from the side surface 22A is larger than the amount of projection of the incidence side holding portions 2221 from the side surface 22A.

The first holding portion 221 are formed projecting to the holder 22 side surface 22A extending from the incidence side holding portions 2221 of the second holding portion 222 to the luminous flux exit side (X(+) side). Also, a formation is such that the amount of projection of the first holding portion 221 is smaller than the amount of projection of the second holding portion 222. Also, three first holding portion 221 are formed corresponding to the incidence side holding portions 2221.

Next, a description will be given of a method of assembling the relay lens 433 into the lens frame 20. In the embodiment, the relay lens 433 is inserted from the direction of the luminous flux incidence side (X(−)) of the lens frame 20. Then, firstly, the lens frame 20 is deformed (elastically deformed) outward (in the arrowed directions shown in FIG. 3A) using a tool (not shown). Specifically, a tool formed of a round bar is inserted into the holes 241 formed near both sides of the opening 23, and the lens frame 20 is elastically deformed by being widened in the left and right directions (Y axis directions). The lens frame 20, being formed from a resin material having elasticity, even though being deformed, returns to an original position due to the elasticity.

After the lens frame 20 is deformed outward with the tool, the relay lens 433 is inserted into the holder 22 from the luminous flux incidence direction (X(−) direction). At this time, the luminous flux exit surface 433C of the relay lens 433 is caused to pass through the incidence side holding portions 2221 of the holder 22 and, after it is put into a condition in which it is in contact with the exit side holding portions 2222, the outward deformation of the lens frame 20 with the tool is stopped. By this operation, the relay lens 433 is held in the holder 22, as shown in FIG. 4.

In the condition in which the relay lens 433 is held in the holder 22, as shown in FIG. 4, the peripheral end face 433A of the relay lens 433 makes contact with the three first holding portion 221, and an elastic force is applied inward (in the arrowed directions shown in FIG. 3B), holding the relay lens 433. The luminous flux exit surface 433C near the peripheral end face 433A of the relay lens 433 makes contact with the projecting corners of the exit side holding portions 2222 of the second holding portion 222, holding the relay lens 433. Also, the luminous flux incidence surface 433B near the peripheral end face 433A of the relay lens 433 makes contact with the projecting corners of the incidence side holding portions 2221 of the second holding portion 222, holding the relay lens 433.

In the embodiment, one surface side of the relay lens 433 first inserted into the second holding portion 222 is the luminous flux exit surface 433C. Also, areas with which the projecting corners of the exit side holding portions 2222 holding the luminous flux exit surface 433C make contact are holding areas of the exit side holding portions 2222. Then, the other surface side of the relay lens 433 is the luminous flux incidence surface 433B. Also, areas with which the projecting corners of the incidence side holding portions 2221 holding the luminous flux incidence surface 433B make contact are holding areas of the incidence side holding portions 2221. Then, in the embodiment, the holding areas of the exit side holding portions 2222 are formed in such a way as to be wider than the holding areas of the incidence side holding portions 2221.

As heretofore described, by the peripheral end face 433A, luminous flux incidence surface 433B, and luminous flux exit surface 433C of the relay lens 433 attaining a condition in which they are sandwiched from three directions by the first holding portion 221, incidence side holding portions 2221, and exit side holding portions 2222, the relay lens 433 is positioned, and held in the holder 22, without rattling. By this means, the lens holding device 2 with the relay lens 433 held in the lens frame 20 is completed, as shown in FIG. 3B.

When removing the relay lens 433 from the lens frame 20, it is possible to remove the relay lens 433 by deforming the lens frame 20 outward with the heretofore described tool.

A stress analysis is carried out on the holder 22 by a simulation, including the frame main body 21. By this means, the holder 22 and frame main body 21 are caused to have a shape such that an elastic deformation force and stress when the lens frame 20 is widened in the left and right directions (Y axis directions), or a holding force when the relay lens 433 is held by the holder 22, is of an optimum value. Also, the frame main body 21 is caused to have a shape which enables a stress dispersion capable of withstanding an excessive force at an operating time by optimizing a ratio in a thickness direction or width direction by means of the simulation. Also, the frame main body 21 is caused to have a shape such that the amount of deformation of the lens frame 20 due to a thermal stress can be made sufficiently small even in a high temperature environment for the usage of the projector 1.

In the above description, the assembly is performed using the tool, but this is a description when carrying out a mass production of the lens holding device 2 and, although omitted in the above description, with respect to the relay lens 433 to be inserted into the holder 22 too, the insertion is carried out by adsorbing the luminous flux incidence surface 433B using a suction apparatus (not shown).

Apart from the heretofore described assembly method, with the lens frame 20 of the embodiment, it is also possible to hold the relay lens 433 in the lens frame 20 without using the tool. Specifically, the luminous flux exit surface 433C of the relay lens 433 is mounted on the luminous flux incidence side of the three incidence side holding portions 2221 of the holder 22, and pushed into the luminous flux exit side (exit side holding portion 2222 side). The lens frame 20 is elastically deformed outward due to this pushing-in force, enabling the relay lens 433 to be held in the holder 22 of the lens frame 20.

In the completed lens holding device 2, the fixing portion 26 of the lens holding device 2 (lens frame 20) are inserted into lens holding device fixing grooves 45B1 formed in the lower housing case 45B, shown in FIG. 2. Then, an optical axis adjustment of the lens holding device 2 (relay lens 433) is carried out using an optical axis adjustment jig (not shown). Specifically, the optical axis adjustment jig is brought into engagement with the engagement projections 251 of the projecting portion 25 of the lens frame 20, and the adjustment in the up-down and left-right directions (two axial directions) is carried out. A gap which allows a movement of the fixing portion 26 due to the adjustment is secured for the lens holding device fixing grooves 45B1.

When the optical axis adjustment is finished, a fixing adhesive is injected from the inlets 261 of the fixing portion 26 with a dispenser (not shown), or the like. By the fixing portion 26 and lens holding device fixing grooves 45B1 being fixed in this way, the lens holding device 2 is fixed to the lower housing case 45B. The holder 22 is also fixed by the fixing portion 26 being adhesively fixed in the lens holding device fixing grooves 45B1. Therefore, as it is also possible to suppress a deformation of the lens frame 20, the position of the relay lens 433 is maintained without the relay lens 433 being shifted in position with respect to the lens frame 20 either.

According to the heretofore described embodiment, the following advantages can be obtained.

1. According to the lens frame 20 of the embodiment, when building the relay lens 433 into the holder 22 of the frame main body 21, simply by elastically deforming the frame main body 21 outward, and inserting the relay lens 433, it is possible to hold the relay lens 433 due to the elastic force of the holder 22. Also, when holding the relay lens 433, the first holding portion 22 hold the peripheral end face 433A of the relay lens 433, the incidence side holding portions 2221 of the second holding portion 222 hold the luminous flux incidence surface 433B of the relay lens 433, and the exit side holding portions 2222 hold the luminous flux exit surface 433C of the relay lens 433. By this means, it is possible to reliably hold the relay lens 433 without rattling, or the like. Consequently, it is possible to achieve an improvement in an ease of assembling the relay lens 433 into the lens frame 20, and it is possible to realize the lens frame 20 which can reliably hold the relay lens 433 with a simple configuration.

2. According to the lens frame 20 of the embodiment, it is formed in such a way that the holding areas of the exit side holding portions 2222 are wider than the holding areas of the incidence side holding portions 2221. Consequently, when first inserting the luminous flux exit surface 433C side of the relay lens 433 into the lens frame 20, it is possible to stably insert the relay lens 433.

3. According to the lens frame 20 of the embodiment, when inserting the relay lens 433 into the frame main body 21, it being possible to subject the frame main body 21 to a distortion suppressed elastic deformation, it is possible to carry out the stable insertion. Also, as it is possible to cause the distortion suppressed elastic deformation, it is possible to carry out an appropriate design with respect to the shape of the first holding portion 221 and second holding portion 222, the amount of deformation and holding force of the frame main body 21, and the like.

4. According to the lens frame 20 of the embodiment, by including the auxiliary portion 24, it is possible to use the tool, and it is also possible to make the amount of elastic deformation constant, so it is possible to prevent a breakage or damage of the frame main body 21 when inserting the relay lens 433. Also, as it is possible to achieve an automation of a process of inserting and holding the relay lens 433 in the frame main body 21, and it is possible to improve a cycle time, it is possible to achieve a cost reduction in manufacturing the lens holding device 2.

5. According to the lens frame 20 of the embodiment, by the auxiliary portion 24 being installed near both sides of the opening 23 of the frame main body 21, when using the tool, or the like, it being possible to reduce a force for causing the elastic deformation in comparison with a case in which the opening 23 is installed in a portion other than near both sides, it is possible to elastically deform the frame main body 21 outward. Consequently, it becomes easier to insert the relay lens 433 into the lens frame 20.

6. According to the lens holding device 2 of the embodiment, as it is possible to reliably hold the relay lens 433 with the simply configured lens frame 20, a reliability of quality of the lens holding device 2 is improved.

7. According to the projector 1 of the embodiment, as the projector 1 is configured including the lens holding device 2 which reliably holds the relay lens 433 with the simply configured lens frame 20, a reliability of quality of the projector 1 is improved.

The invention, not being limited to the heretofore described embodiment, can be implemented by adding various alterations, improvements, or the like. Modification examples will be described hereafter.

Modification Example 1

In the previously described embodiment, the luminous flux exit surface 433C side of the relay lens 433 is first inserted from the luminous flux incidence side of the lens frame 20 but, by forming a structure of the second holding portion 222 in which the incidence side and exit side are interchanged, it is also possible to first insert the luminous flux incidence surface 433B side of the relay lens 433 from the luminous flux exit side of the lens frame 20. In this case, by forming the lens frame 20 in such a way that the holding areas of the incidence side holding portions are wider than the holding areas of the exit side holding portions, it is possible to stably insert the relay lens 433.

Modification Example 2

In the previously described embodiment, when holding the relay lens 433 in the holder 22, the incidence side holding portions 2221 of the second holding portion 222 hold the luminous flux incidence surface 433B of the relay lens 433, and the exit side holding portions 2222 hold the luminous flux exit surface 433C of the relay lens 433. However, the invention not being limited to this, it is acceptable to adopt a configuration such that the incidence side holding portions 2221 of the second holding portion 222 hold a ridge line portion between the luminous flux incidence surface 433B and peripheral end face 433A of the relay lens 433, and the exit side holding portions 2222 of the second holding portion 222 hold a ridge line portion between the luminous flux exit surface 433C and peripheral end face 433A of the relay lens 433.

Modification Example 3

In the previously described embodiment, a configuration is such that the relay lens 433 is held by the lens frame 20. However, the invention not being limited to this, as a lens, it is also acceptable to apply the lens frame to a condenser lens, such as the superimposing lens 415, incidence side lens 431, or field lens 419, configuring an optical system of the projector 1.

Modification Example 4

In the previously described embodiment, the frame main body 21 includes the auxiliary portion 24 for elastically deforming the frame main body 21 outward, but it is acceptable that the frame main body does not include the auxiliary portion 24. In this case, it is also acceptable that, by mounting the lens on the holder, and pushing it in the direction of insertion, the frame main body is elastically deformed outward, and the lens is inserted and held in the lens frame, as described in the previously described embodiment.

Modification Example 5

The shape of the frame main body 21, the shape of the holder 22 (the first holding portion 221 and second holding portion 222), the number thereof, and the like, not being limited to the previously described embodiment, can be changed appropriately.

Modification Example 6

In the projector 1 of the previously described embodiment, a discharge type lamp is used as the light source lamp 411A configuring the light source device 411 but, the invention not being limited to this, it is possible to use a light emitting diode (LED) device, a laser diode (LD) device, or the like, as a light source device.

Modification Example 7

The projector 1 of the previously described embodiment is applied as a front type projector, but can also be applied to a rear type projector integrally including the screen as the projection object surface.

Modification Example 8

In an optical system of the projector 1 of the previously described embodiment, transmissive liquid crystal panels are used as the liquid crystal panels 441 acting as the optical modulation devices, but it is also possible to use reflective optical modulation devices, such as reflective liquid crystal panels.

Modification Example 9

In the optical system of the projector 1 of the previously described embodiment, the liquid crystal panels 441 are used as the optical modulation devices. However, the invention not being limited to this, generally, it is sufficient that they are ones which modulate incident luminous fluxes based on an image signal, and it is acceptable to use micromirror type optical modulation devices, or the like. As micromirror type optical modulation devices, it is possible to use, for example, digital micromirror devices (DMD's).

Modification Example 10

In the optical system of the projector 1 of the previously described embodiment, a so-called three-panel type using the three liquid crystal panels 441 corresponding to the red color light, green color light, and blue color light is employed as the liquid crystal panels 441 acting as the optical modulation devices but, the invention not being limited to this, it is acceptable to employ a single-panel type. Also, it is also acceptable to employ it by adding a liquid crystal panel for improving a contrast.

The present application claims priority from Japanese Patent Application No. 2009-017711 filed on Jan. 29, 2009, which is hereby incorporated by reference in its entirety.

What is claimed is:

1. A lens frame configured to hold a lens of an optical system of a projector, the lens having a luminous flux incidence surface configured to intersect an illumination optical axis of luminous flux emitted from a light source of the projector, a luminous flux exit surface opposite the luminous flux incidence surface, and a peripheral end surface configured to face radially outward relative to the illumination optical axis, the lens frame comprising:
    a frame main body configured to substantially radially surround the peripheral end surface of the lens relative to the illumination optical axis, the frame main body including a holder that is substantially formed along the peripheral end surface of the lens, the holder being configured to hold the lens which is inserted by an elastic force of the frame main body,
wherein:
    the holder includes a first holding portion configured to hold a peripheral end surface of the lens, and a second holding portion configured to hold a luminous flux incidence surface and luminous flux exit surface of the lens;
    the frame main body includes an opening extending through a portion of the frame main body, the opening being configured to extend away from a portion of the peripheral end surface of the lens such that the portion of the peripheral end surface of the lens is not radially surrounded by the frame main body relative to the illumination optical axis; and
    the frame main body has a fixing portion, and the lens is fixed to the holder of the frame main body by fixing the fixing portion to a housing case of the projector such that deformation of the lens frame is suppressed, the lens being fixed to the holder by an action of an elastic force of the frame main body.

2. The lens frame according to claim 1, wherein
the second holding portions is formed so that holding areas of the second holding portion configured to hold one surface side of the lens to be first inserted are wider than holding areas of the second holding portion configured to hold the other surface side of the lens.

3. The lens frame according to claim 1, wherein
the opening in the frame main body is made by cutting out one portion of the holder.

4. The lens frame according to claim 1, wherein
the frame main body includes auxiliary portion for elastically deforming the frame main body outward.

5. The lens frame according to claim 4, wherein
the auxiliary portion are installed near both sides of the opening of the frame main body.

6. A projector, comprising
the lens frame according to claim 5;
a lens configuring an optical system of a projector is held in the lens frame;
a light source configured to emits a luminous flux; and
an optical modulation device configured to modulate the luminous flux emitted from the light source and transmitted via the lens holding device, based on an image signal.

7. The projector according to claim 6, wherein
the second holding portion are formed so that holding areas of the second holding portion configured to hold one surface side of the lens to be first inserted are wider than holding areas of the second holding portion configured to hold the other surface side of the lens.

8. The projector according to claim 6, wherein the opening in the frame body is made by cutting out one portion of the holder.

9. The projector according to claim 6, wherein the frame main body includes auxiliary portion for elastically deforming the frame main body outward.

10. The projector according to claim 9, wherein the auxiliary portion are installed near both sides of the opening of the frame main body.

11. The lens frame according to claim 1, wherein the fixing portion is fixed within a fixing groove formed in the housing case.

12. The lens frame according to claim 1 wherein the frame main body includes a first auxiliary portion disposed on a first side of the opening and a second auxiliary portion disposes on a second of the opening such that the frame main body is elastically deformed outward so as to increase the size of the opening when the first auxiliary portion and the second auxiliary portion are forced in opposite directions.

13. The lens frame according to claim 12, wherein at least one of the first auxiliary portion and the second auxiliary portion includes a hole extending through the frame main body.

\* \* \* \* \*